United States Patent [19]

Umeyama

[11] Patent Number: 5,603,241
[45] Date of Patent: Feb. 18, 1997

[54] VEHICLE TRANSMISSION SYSTEM CAPABLE OF SIMULTANEOUS SLIPPING OF FRICTIONAL COUPLING DEVICES DISPOSED IN DIFFERENT GEAR TRAINS BETWEEN INPUT AND OUTPUT SHAFTS

[75] Inventor: Mitsuhiro Umeyama, Toyota, Japan

[73] Assignee: Toyota Jidosha Kabushiki Kaisha, Toyota, Japan

[21] Appl. No.: 453,212

[22] Filed: May 30, 1995

[30] Foreign Application Priority Data

Jun. 24, 1994 [JP] Japan .................. 6-142747

[51] Int. Cl.⁶ .................. F16H 59/00
[52] U.S. Cl. .................. 74/325; 74/331; 74/335; 475/207
[58] Field of Search .................. 74/335, 325, 331; 475/209, 207; 477/115

[56] References Cited

U.S. PATENT DOCUMENTS

| | | | |
|---|---|---|---|
| 4,200,006 | 4/1980 | Ehrlinger et al. | 475/207 X |
| 4,375,172 | 5/1983 | Richards et al. | 74/331 X |
| 4,404,869 | 9/1983 | Numazawa et al. | 475/207 |
| 4,488,446 | 12/1984 | Nishikawa et al. | 74/331 X |
| 4,860,607 | 8/1989 | Numazawa et al. | 74/336 R |
| 4,924,729 | 5/1990 | Sherman et al. | 475/207 |
| 5,030,179 | 7/1991 | Ganoung | 74/333 X |
| 5,193,417 | 5/1993 | Niiyama et al. | 74/335 X |
| 5,367,914 | 11/1994 | Ordo | 74/331 |
| 5,433,125 | 7/1995 | Müller | 74/335 X |
| 5,445,042 | 8/1995 | Deady | 74/335 X |

FOREIGN PATENT DOCUMENTS 62-93541  4/1987  Japan .

*Primary Examiner*—Charles A. Marmor
*Assistant Examiner*—Peter Kwon
*Attorney, Agent, or Firm*—Oblon, Spivak, McClelland, Maier & Neustadt, P.C.

[57] ABSTRACT

A motor vehicle transmission system including frictional coupling devices disposed in series connection with respective gear trains between input and output shafts, a one-way clutch disposed in series connection with each of at least one of the gear trains except the smallest gear ratio gear train, for transmitting power from the input shaft to the output shaft, and a shift controller operable during forward running of the vehicle to operate the frictional coupling devices for simultaneous slipping or partial engagement of selected frictional coupling devices, particularly, upon and immediately after starting of the vehicle.

12 Claims, 9 Drawing Sheets

VEHICLE TRANSMISSION SYSTEM CAPABLE OF SIMULTANEOUS SLIPPING OF FRICTIONAL COUPLING DEVICES DISPOSED IN DIFFERENT GEAR TRAINS BETWEEN INPUT AND OUTPUT SHAFTS

BACKGROUND OF THE INVENTION

1. Field of the Invention

The present invention relates in general to a transmission system of a motor vehicle including a transmission with a plurality of gear trains having respective different gear ratios, and more particularly to an apparatus for controlling a shifting operation of such a transmission.

2. Discussion of the Related Art

There is known a vehicle transmission of a parallel 2-axes type having an input shaft adapted to receive power from a power source, an output shaft adapted to receive the power from the input shaft, and a plurality of gear trains which connect the input and output shaft for power transmission therebetween and which have respective different gear ratios. An example of the parallel 2-axes type of vehicle transmission is disclosed in JP-A-62-93541 (published on Apr. 30, 1987). In this automatic transmission of parallel 2-axes type, a first gear train 12, 32 for establishing a low-gear position of the transmission is disposed to connect an input shaft 10 and an output shaft 30 via a first one-way clutch OWC2 and a first clutch C1, while a second gear train 14, 36 for establishing a high-gear position of the transmission is disposed to connect the input and output shafts 10, 30 via a second clutch C2. A shift-up action of the thus constructed transmission from the low-gear position to the high-gear position can be effected by simply engaging the second clutch C2 while the first clutch C1 is held in the engaged state. The high-gear position is smoothly established owing to a slipping action of the one-way clutch OWC2.

In the known vehicle transmission described above wherein the first and second clutches C1, C2 function as frictional coupling devices, these frictional coupling devices must be operated each time the transmission is shifted. Further, the transmission must be controlled by a control apparatus adapted to automatically select one of the gear positions according to an appropriate one of memory-stored shift patterns or maps, and on the basis of a load currently acting on an engine of the motor vehicle and a current running speed of the vehicle, and control a hydraulic circuit for activating the appropriate frictional coupling devices to establish the selected gear position. Therefore, the control apparatus must have a complicated control arrangement for performing various functions associated with the shifting operation of the transmission, and tends to be expensive.

In the known transmission, only one gear train or power transmitting path is provided for establishing each gear position of the transmission. Accordingly, each gear train and the frictional coupling device incorporated therein must have a torque transmission capacity large enough to withstand the maximum output torque of the vehicle engine. In particular, the gear train and its frictional coupling device for establishing the low-gear or 1st-speed position of the transmission must have a considerably large capacity. Consequently, the size and weight of the transmission tend to be undesirably large.

SUMMARY OF THE INVENTION

The present invention was developed in view of the problem experienced in the known vehicle transmission as described above. It is therefore an object of the present invention to provide a vehicle transmission system which is simple in construction and which permits the vehicle transmission to have comparatively small size and weight.

According to the principle of the present invention, there is provided a transmission system of a motor vehicle having a transmission including an input shaft which receives power from a power source, an output shaft and a plurality of gear trains which have respective different gear ratios and which are disposed so as to connect the input and output shafts for transmitting the power from the input shaft to the output shaft, the transmission system comprising: (a) a plurality of frictional coupling devices disposed in series connection with the plurality of gear trains, respectively; (b) at least one one-way clutch disposed in series connection with corresponding at least one of the plurality of gear trains except one of the gear trains whose gear ratio is the smallest, the at least one one-way clutch being engaged to transmit the power from the input shaft to the output shaft, and released to inhibit the power from being transmitted from the output shaft to the input shaft; and (c) shift control means, operable during a forward running of the motor vehicle, for operating the plurality of frictional coupling devices for simultaneous slipping engagement of selected frictional coupling devices of the plurality of frictional coupling devices for simultaneous transmission of the power from the input shaft to the output shaft through respective ones of the plurality of gear trains which correspond to the selected frictional coupling devices.

In the transmission system of the present invention constructed as described above, the shift control means activates the frictional coupling devices, during a forward running of the vehicle, so as to effect simultaneous slipping or partial engagement of the two or more frictional coupling devices, so that the power is transmitted from the input shaft to the output shaft, simultaneously through the two or more gear trains with which the partially engaged frictional coupling devices are connected in series. As the rotating speed of the output shaft is increased relative to the rotating speed of the input shaft as a result of an increase in the vehicle speed, the one-way clutch disposed in series with the gear train whose gear ratio is the largest is first released. If two or more one-way clutches are provided, the one-way clutch disposed in series with the gear train whose gear ratio is the next largest is then released. Thus, the one-way clutches are sequentially released, so that the overall equivalent gear ratio of the transmission as a whole is lowered in steps, whereby the transmission is smoothly shifted up from the lowest gear position toward the highest gear position.

Therefore, the present transmission system does not require an expensive controller for selectively engaging one of the plurality of frictional coupling devices on the basis of the currently detected load of the power source and vehicle speed. Rather, the shift control means is adapted to simply effect simultaneous slipping or partial engagement of the selected frictional coupling devices, which results in automatic stepping change of the overall equivalent gear ratio of the transmission as the vehicle speed is raised. Accordingly, the arrangement of the shift control means can be made simple and inexpensive. Further, the plurality of gear trains in the transmission of the present transmission system are disposed in parallel with each other between the input and output shafts, for parallel or simultaneous transmission of power through these gear trains. Accordingly, the load acting on the transmission is distributed to the two or more gear trains, whereby the required torque capacities of the gear trains and the torque capacities of the frictional coupling devices and one-way clutch or clutches in series connection with the gear trains can be reduced as compared with those of the known transmission. Consequently, the size and weight of the transmission can be accordingly reduced.

In a first preferred form of the present invention, the plurality of gear trains include a first gear train, a second gear train and a third gear train whose gear ratios decrease in the order of description, and the plurality of frictional coupling devices include a first, a second and a third frictional coupling device which are disposed in series connection with the first, second and third gear trains, respectively. In this form of the invention, the above-indicated at least one one-way clutch includes a first and a second one-way clutch which are disposed in series connection with the first and second gear trains, and the shift control means is arranged to simultaneously place the first, second and third frictional coupling devices in partially engaged states thereof for an initial period of time upon starting of the motor vehicle, so that the power is distributed to the three gear trains when the power is transmitted from the input shaft to the output shaft.

In a second preferred form of the invention, the the first, second and third frictional coupling devices are disposed in series connection with the respective first, second and third gear trains, and the first and second one-way clutches are disposed in series connection with the first and second gear trains, as in the first preferred form of the invention. However, the shift control means is arranged to simultaneously place the first and second frictional coupling devices in partially engaged states thereof while holding the third frictional coupling device in a fully released state in an initial period time upon starting of the motor vehicle, and place the third 10 frictional coupling device in a partially engaged state before the second frictional coupling device is brought to a fully engaged state thereof. This form of the invention permits the vehicle to be started and initially accelerated with an increased drive torque since the power is transmitted from the input shaft to the output shaft through the first and second gear trains whose gear ratios are comparatively large. This advantage of the increased drive torque can be offered in addition to the reduced load on each gear train owing to the distribution of the power to the two gear trains. It is noted that the third frictional coupling is held in the fully released state for an initial period of time after starting of the vehicle until the second frictional coupling device is brought to the fully engaged state. This means a reduced period of slipping or partial engagement of the third frictional coupling device, and results in increased durability of the third frictional coupling device.

In one advantageous arrangement of the above second preferred form of the invention, the gear ratios of the first, second and third gear trains are selected to correspond to a first-speed, a second-speed and a third-speed gear position of the transmission, respectively. The first-speed gear position has a largest speed reduction ratio. In this case, the shift control means places the first frictional coupling device in a partially engaged state thereof upon starting of the motor vehicle. This arrangement assures further increased drive torque for initial acceleration of the vehicle.

In a third preferred form of this invention, the transmission system further comprises a hydraulically operated actuator for operating the plurality of frictional coupling devices with a hydraulic pressure, and the shift control means comprises means for controlling the application of the hydraulic pressure to the hydraulically operated actuator for controlling the engagement of the frictional coupling devices. For instance, the shift control means comprises a common clutch control valve for controlling the application of the hydraulic pressure to the actuator for operating the frictional coupling devices. This arrangement does not require two or more hydraulic actuators and corresponding control valves for operating the respective frictional coupling devices independently of each other, whereby the hydraulic circuit for controlling the frictional coupling devices can be simplified.

In one advantageous arrangement of the above third form of the invention, each of the frictional coupling devices comprises a plurality of friction members which are disposed in series with a corresponding one of the gear trains for connecting the corresponding gear train to the input and output shafts, and the hydraulically operated actuator comprises a common clutch piston provided on one of the input and output shafts such that the common clutch piston is movable in an axial direction of the input and output shafts, between a first position in which the corresponding gear train is connected to the input and output shafts through the friction members, and a second position in which the corresponding one gear train is disconnected from the input and output shafts by the friction members. Since the single common clutch piston is used to operate the frictional coupling devices, the hydraulic actuator and the shift control means for controlling the hydraulic actuator can be simplified.

According to one desirable feature of the above arrangement, each of the gear trains includes an axially movable gear provided on the input shaft or the output shaft such the axially movable gear is axially movable in the axial direction. In this case, the friction members of each frictional coupling device are disposed within the axially movable gear, and the common clutch piston is adapted to directly push the friction members of one of the frictional coupling devices against each other when the common clutch piston is moved from the second position to the first position, and push the friction members of each of the other frictional coupling device or devices via the axially movable gears of all the gear trains when the common clutch piston is moved from the second position to the first position. This arrangement permits reduction in the number of the required components of the transmission system, and reduction in the axial length of the transmission.

The input shaft of the transmission may be directly connected to the power source, without a difference between an operating speed of the power source and a rotating speed of the input shaft. In this case, the transmission system does not incorporate a torque converter, but is capable of smoothly starting the vehicle by simultaneous slipping of the two or more frictional coupling devices.

Alternatively, an auxiliary transmission may be interposed between the power source and the input shaft. The auxiliary transmission has a plurality of gear positions for forward driving of the motor vehicle, so that the transmission system provides an increased number of gear positions having different speed reduction ratios, namely, the number of the gear positions of the auxiliary transmission multiplied by the number of the gear trains of the main transmission.

BRIEF DESCRIPTION OF THE DRAWINGS

The above and optional objects, features, advantages and technical significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
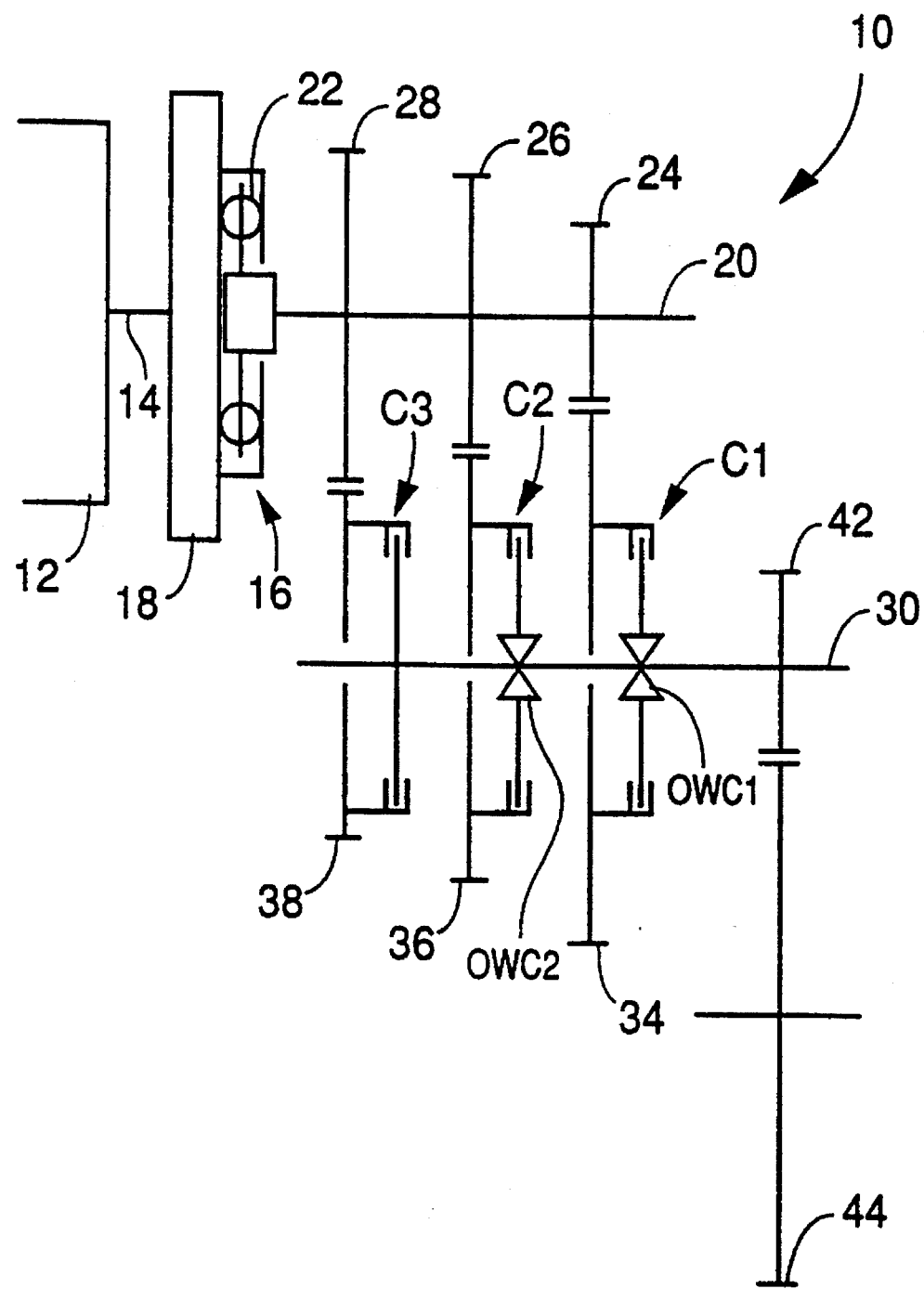
FIG. 1 is a schematic view illustrating a transmission of a motor vehicle transmission system constructed according to one embodiment of the present invention.
Figure 2:
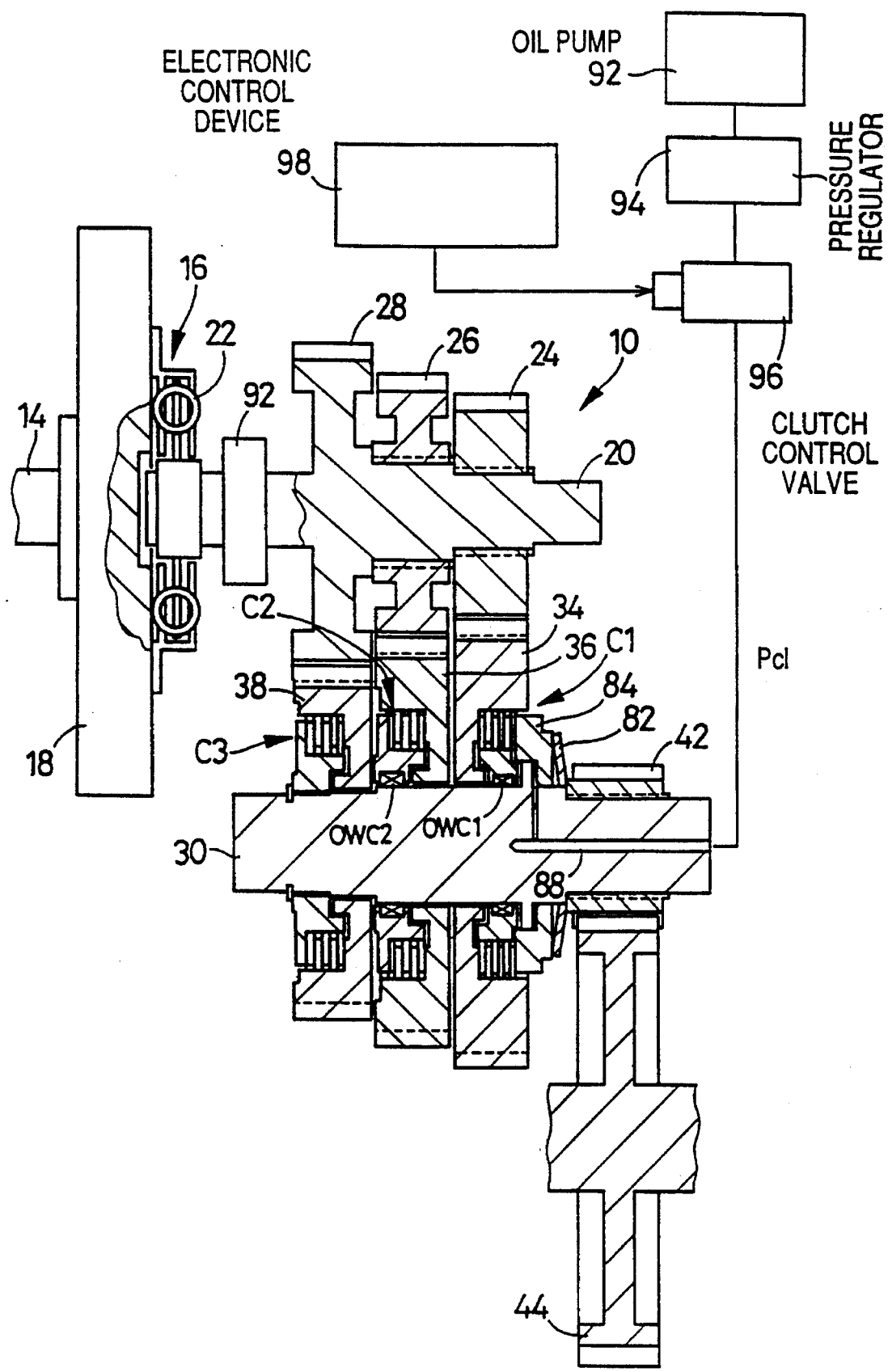
FIG. 2 is a cross sectional view showing details of an arrangement of the transmission of FIG. 1, and a control arrangement including an electronic control device for controlling the transmission.

Referring first to FIGS. 1 and 2, there is shown a transmission system of a motor vehicle including a transmission 10 of parallel 2-axes type, and a control arrangement including an electronic control device 98 (FIG. 2) for controlling a shifting operation of the transmission 10.

The transmission 10 has an input shaft 20 which is connected to an engine 12 of the vehicle through a crankshaft 14, and a flywheel 18 equipped with a damper 16 for absorbing a torque variation of the engine 12. Power generated by the engine 12 is transmitted to drive wheels of the vehicle through the present transmission 10, a differential gear device and an axle connected to the drive wheels, as well known in the art. Like a single-disc clutch, the damper 16 has a mechanism which permits relative rotation between the crankshaft 14 and the input shaft 20 over a predetermined angular range, against a biasing force of a spring 22. Unlike a torque converter, a fluid coupling or a friction clutch, the damper 16 does not permit a difference between the rotating speeds of the crankshaft 14 and the input shaft 20. In this sense, the crankshaft 14 and the input shaft 20 are considered to be directly coupled to each other.

To the input shaft 20 of the transmission 10, there are fixed a first gear 24, a second gear 26 and a third gear 28 whose diameters increase in the order of description and which are spaced apart from each other in the axial direction. The transmission 10 has an output shaft 30 which is parallel to the input shaft 20 and spaced from the input shaft 20 in the radial direction of the input shaft 20. To this output shaft 30, there are mounted a fourth gear 34 meshing with the first gear 24, a fifth gear 36 meshing with the second gear 26, and a sixth gear 38 meshing with the third gear 28. These fourth, fifth and sixth gears 34, 36, 38 are rotatable relative to the output shaft 30. The first and fourth gears 24, 34 constitute a first gear train having a first gear ratio $\gamma 1$, and the second and fifth gears 26, 36 constitute a second gear train having a second gear ratio $\gamma 2$, while the third and sixth gears 28, 38 constitute a third gear train having a third gear ratio $\gamma 3$. The gear ratios $\gamma 1$, $\gamma 2$, $\gamma 3$ are defined as $\omega i/\omega o$, where $\omega i$ represents the rotating speed of the input shaft 20, while $\omega o$ represents the rotating speed of the output shaft 30. The gear ratios $\gamma 1$, $\gamma 2$, $\gamma 3$ have a relationship $\gamma 1 > \gamma 2 > \gamma 3$.

Figure 3:
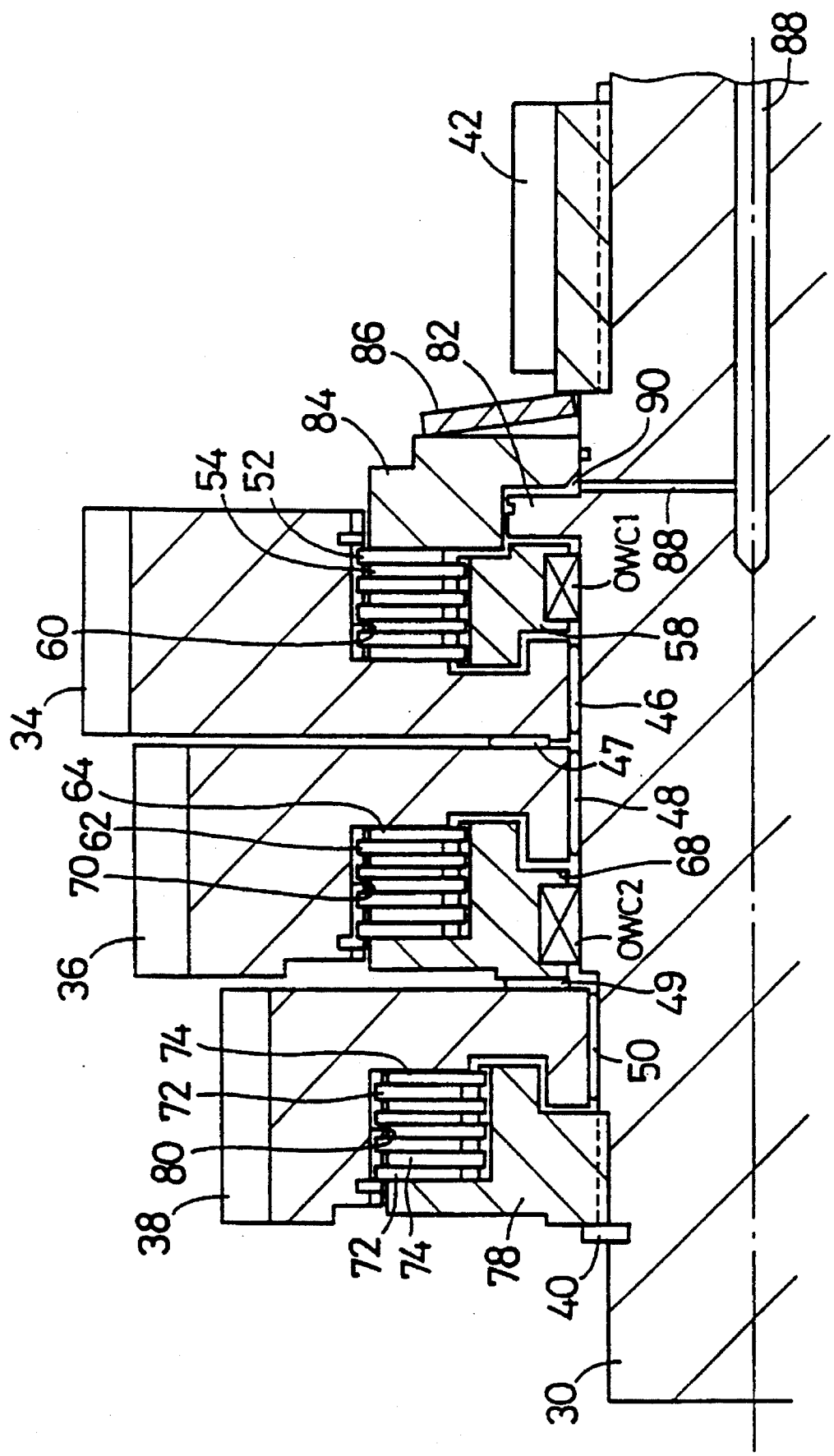
FIG. 3 is an enlarged cross sectional view showing a part of the transmission of FIG. 1.

Referring next to FIG. 3, the output shaft 30 has a stopper ring 40 fitted thereon at one end portion thereof, and a final pinion 42 splined thereto at the other end portion thereof. The final pinion 42 is axially slidable relative to the output shaft 30, but is not rotatable relative to the output shaft 30. The final pinion 42 meshes with a final gear 44, as shown in FIGS. 1 and 2. The final gear 44 is operatively linked with the drive wheels of the vehicle. The fourth gear 34, fifth gear 36 and sixth gear 38 10 are mounted on the output shaft 30 via respective needle bearings 46, 48, 50, and a thrust bearing 47 is interposed between the gears 34 and 36 while a thrust bearing 49 is interposed between the gears 36 and 38, so that the gears 34, 36, 38 are rotatable and axially movable relative to the output shaft 30.

In a radially inner portion of the fourth gear 34, there is formed an annular groove 60 which accommodates a plurality of annular friction members 52, a plurality of annular friction members 54, a one-way clutch OWC1 axially slidably splined to the output shaft 30, and a first clutch hub 58 fixed to the one-way clutch OWC1. The annular friction members 52, 54 are alternately arranged in the axial direction. The friction members 52 are splined to the inner circumferential surface of the annular groove 60 such that the friction members 52 are axially movable relative to the fourth gear 34 but are not rotatable relative to the fourth gear 34. The friction members 54 are splined to the outer circumferential surface of the first clutch hub 58 such that the friction members 54 are axially movable relative to the first clutch hub 58 but are not rotatable relative to the clutch hub 58. The friction members 52, 54 and the first clutch hub 58 constitute a first friction clutch C1, which serves as a first frictional coupling device of the transmission 10. The fourth gear 34 cooperates with the first gear 24 to constitute a first gear train between the input and output shafts 20, 30. The first friction clutch C1 and the one-way clutch OWC1 are disposed in series with the first gear train 24, 34. The one-way clutch OWC1 is engaged to transmit power from the input shaft 20 to the output shaft 30, and is released to inhibit the power from being transmitted from the output shaft 30 to the input shaft 20.

In a radially inner portion of the fifth gear 36, there is formed an annular groove 70 which accommodates a plurality of annular friction members 62, a plurality of annular friction members 64, a one-way clutch OWC2 axially slidably splined to the output shaft 30, and a second clutch hub 68 fixed to the one-way clutch OWC2. The annular friction members 62, 64 are alternately arranged in the axial direction. The friction members 62 are splined to the inner circumferential surface of the annular groove 70 such that the friction members 62 are axially movable relative to the fifth gear 36 but are not rotatable relative to the fifth gear 36. The friction members 64 are splined to the outer circumferential surface of the second clutch hub 68 such that the friction members 64 are axially movable relative to the second clutch hub 68 but are not rotatable relative to the clutch hub 68. The friction members 62, 64 and the second clutch hub 68 constitute a second friction clutch C2, which serves as a second frictional coupling device of the transmission 10. The fifth gear 36 cooperates with the second gear 26 to constitute a second gear train between the input and output shafts 20, 30. The second friction clutch C2 and the one-way clutch OWC2 are disposed in series with the second gear train 26, 36. The one-way clutch OWC2 has the same function as the one-way clutch OWC1.

In a radially inner portion of the sixth gear 38, there is formed an annular groove 80 which accommodates a plurality of annular friction members 72, a plurality of annular friction members 74, and a third clutch hub 78 axially slidably splined to the output shaft 30. The annular friction members 72, 74 are alternately arranged in the axial direction. The friction members 72 are splined to the inner circumferential surface of the annular groove 80 such that the friction members 72 are axially movable relative to the sixth gear 38 but are not rotatable relative to the sixth gear 38. The friction members 74 are splined to the outer circumferential surface of the third clutch hub 78 such that the friction members 74 are axially movable relative to the third clutch hub 78 but are not rotatable relative to the clutch hub 78. The friction members 72, 74 and the third clutch hub 78 constitute a third friction clutch C3, which serves as a third frictional coupling device of the transmission 10. The sixth gear 38 cooperates with the third gear 28 to constitute a third gear train between the input and output shafts 20, 30. The third friction clutch C3 is disposed in series with the third gear train 28, 38.

The output shaft 30 has a radially outwardly extending annular flange portion 82 formed between its portions at which the final pinion 42 and the third gear 34 are mounted. This flange portion 82 is formed so as to partially define a radially inner portion of the annular groove 60. An annular clutch piston 84 is mounted on a portion of the output shaft 30 between the flange portion 82 and the final pinion 42. The clutch piston 84 engages the flange portion 82 such that the clutch piston 84 is slidably moved relative to the flange portion 82 in the axial direction. An annular pusher spring 86 is disposed between the final pinion 42 and the clutch piston 84 so as to bias the clutch piston 84 in the axial direction toward the first clutch C1. The output shaft 30 and the clutch piston 84 cooperate with each other to define an oil chamber 90 which communicates with a solenoid-operated clutch control valve 96 through oil passages 88 formed through the output shaft 30. The clutch control valve 96 is provided outside the transmission 10, as indicated in FIG. 2.

When a hydraulic pressure within the oil chamber 90 is raised, the clutch piston 84 is axially moved in the direction toward the final pinion 42 or away from the first clutch C1 against a biasing force of the pusher spring 86, and is disengaged from the outermost friction member 52 of the first clutch C1, whereby the first, second and third clutches C1, C2, C3 are brought to their released states. When the hydraulic pressure within the oil chamber 90 is lowered, the clutch piston 84 is axially moved by the biasing force of the pusher spring 86 in the direction toward the first clutch C1, and is brought into engagement with the outermost friction member 52 of the first clutch C1. Since the leftward axial movements (as seen in FIG. 3) of the gears 34, 36, 38 and hubs 58, 68, 78 are limited by the stopper ring 40, the axial movement of the clutch piston 84 by the pusher spring 86 causes mutual frictional engagement of the friction members 52, 54 of the first clutch C1, which in turn causes mutual frictional engagement of the friction members 62, 64 of the second clutch C2, and those of the friction members 72, 74 of the third clutch C3. Thus, the first, second and third clutches C1, C2, C3 are simultaneously placed in their partially engaged states in which the friction members 52, 54, 62, 64, 72, 74 frictionally slip on each other. The biasing force of the pusher spring 86 is determined so as to provide a suitable amount of slipping of the first, second and third clutches C1, C2, C3.

The solenoid-operated clutch control valve 96 is connected to an oil pump 92 through a pressure regulator 94, so that a predetermined line pressure adjusted by the pressure regulator 94 is applied to the clutch control valve 96, and so that a clutch operating pressure Pcl corresponding to a control signal from the electronic control device 98 is generated by the clutch control valve 96 and applied to the oil chamber 90 through the oil passages 88.

There will next be described a shifting operation of the vehicle transmission 10 performed under the control of the electronic control device 98.

Figure 5:
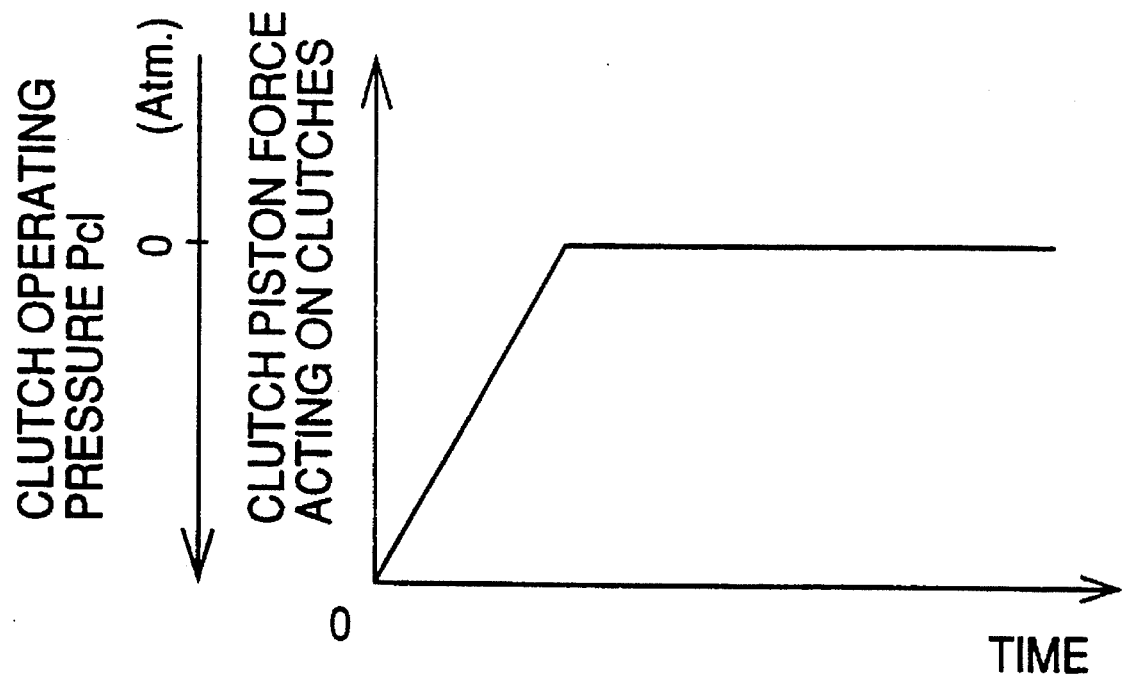
FIG. 5 is a graph for explaining a change of a clutch piston force acting on clutches of the transmission controlled by the electronic control device of FIG. 2.

While the vehicle is stopped with the engine 12 in the idling state, the first, second and third clutches C1, C2, C3 are placed in their fully released states with the clutch pressure Pcl within the oil chamber 90 held at a predetermined level (above the atmospheric pressure). In this condition, the force of the clutch piston 84 acting on the clutches C1, C2, C3 is zero. Upon starting (and initial acceleration) of the vehicle, the control device 98 commands the clutch control valve 96 to lower the clutch pressure Pcl down to the atmospheric level at a relatively low rate, so as to raise the force of the clutch piston 84 acting on the clutches C1, C2, C3, as indicated in the graph of FIG. 5. At the atmospheric level of the clutch pressure Pcl, the force of the clutch piston 84 is held constant as also indicated in FIG. 5. The rate or period of lowering of the clutch pressure Pcl, which determines the rate of increase of the force of the clutch piston 84 acting on the clutches C1–C3, is determined so as to assure smooth starting of the vehicle even if the vehicle is not provided with a torque converter.

Figure 4:
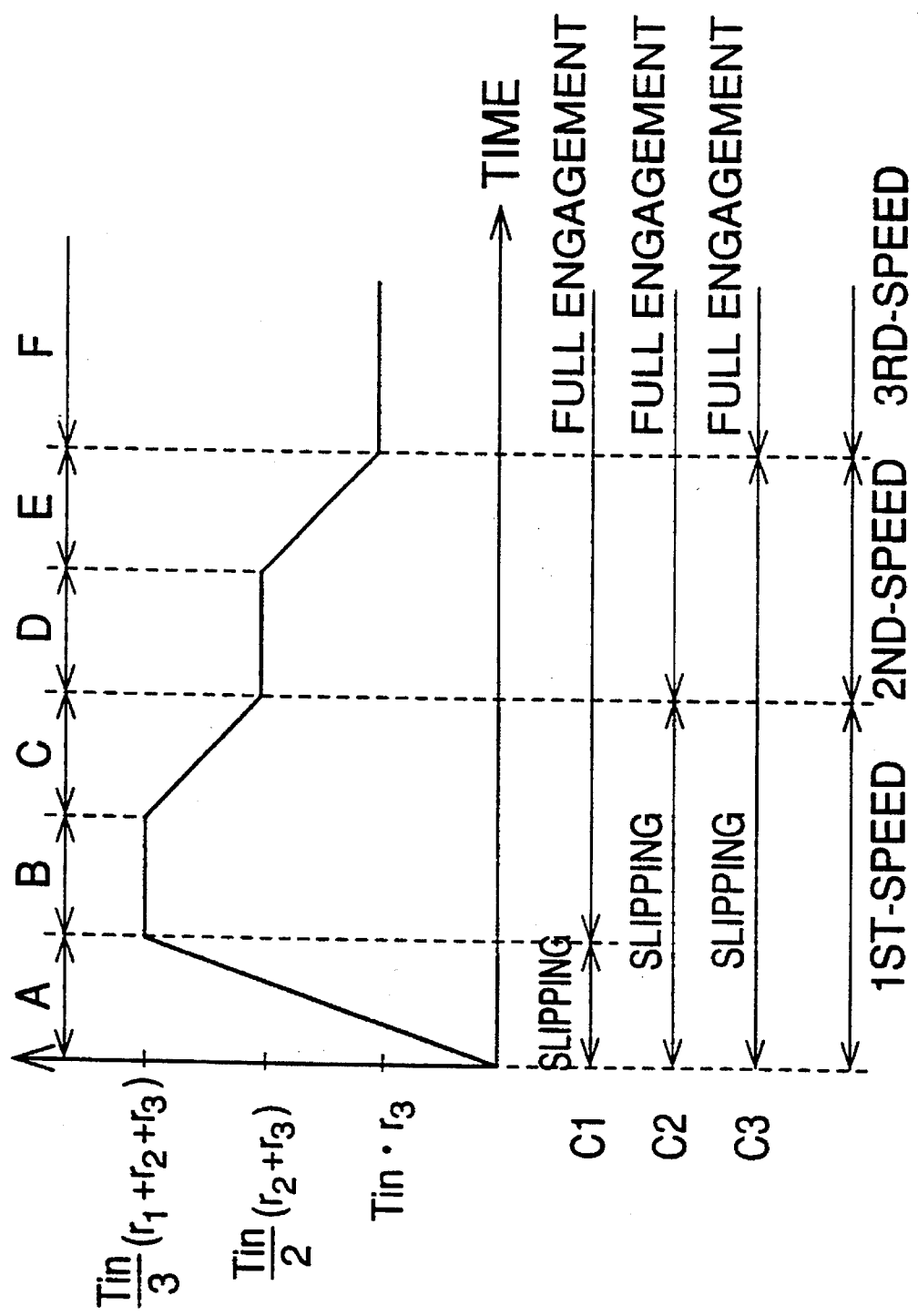
FIG. 4 is a time chart for explaining an operation of the transmission controlled by the electronic control device indicated in FIG. 2.

Thus, the degree of engagement of the clutches C1, C2 and C3 is slowly increased with simultaneous slipping of their friction members 52, 54, 62, 64, 72, 74 upon starting of the vehicle. In other words, the clutches C1–C3 are temporarily placed in the partially engaged states, but for different periods of time as indicated in the graph of FIG. 4. Consequently, an input torque Tin of the input shaft 20 (output torque $T_E$ of the engine 12) is transmitted to the output shaft 30 as an output torque $T_{out}$. The output torque $T_{out}$ is increased from zero during a period A in which all of the three clutches C1–C3 are simultaneously placed in the slipping or partially engaged state, as indicated in FIG. 4. While the clutches C1, C2 and C3 are simultaneously placed in the partially engaged states, the relationship between the rotating speeds $\omega i$ and $\omega o$ of the input and output shafts 20, 30 satisfies the following inequalities:

$$\omega i/\gamma 1 > \omega o,$$

$$\omega i/\gamma 2 > \omega o,$$

$$\omega i/\gamma 3 > \omega o$$

The output torque $T_{out}$ is expressed by the following equation:

$$T_{out} = T_{in}(\gamma 1 + \gamma 2 + \gamma 3)/3$$

An overall equivalent gear ratio $\gamma t$ of the transmission 10 as a whole is expressed by the following equations:

$$\gamma t = T_{out}/T_{in},$$

$$\gamma t = (\gamma 1 + \gamma 2 + \gamma 3)/3$$

As the vehicle is accelerated with the clutches C1–C3 held in the partially engaged states, the rotating speed $\omega o$ of the output shaft 30 is increased with an increase in the vehicle speed, and the rotating speeds ωi and ωo of the input and output shafts 20, 30 change so as to satisfy the following equation and inequalities:

$$\omega i/\gamma 1 = \omega o,$$

$$\omega i/\gamma 2 > \omega o,$$

$$\omega i/\gamma 3 > \omega o$$

When the above equation and inequalities are satisfied, the first clutch C1 is brought to the fully engaged state, and a period B following the above-indicated period A begins, as indicated in FIG. 4. During this period B, the output torque $T_{out}$ of the output shaft 30 and the overall equivalent gear ratio γt of the transmission 10 are held constant.

As the speed of the output shaft is increased relative to that of the input shaft with an increase in the vehicle speed, power tends to be transmitted from the output shaft 30 to the input shaft 20 through the first gear train 24, 34. However, the first one-way clutch OWC1 connected in series with the first clutch C1 is released and slips, so that the power is transmitted from the input shaft 20 to the output shaft 30 through the simultaneously slipping second and third clutches C2 and C3. In this condition, namely, during a period C indicated in FIG. 4, the relationship between the rotating speeds of the input and output shafts 20, 30 satisfies the following inequalities:

$$\omega i/\gamma 1 < \omega o,$$

$$\omega i/\gamma 2 > \omega o,$$

$$\omega i/\gamma 3 > \omega o$$

During the period C, the output torque $T_{out}$ of the output shaft 30 and the overall equivalent gear ratio γt of the transmission 10 are expressed by $T_{out}=T_{in}(\gamma 2+\gamma 3)/2$, and γt=(γ2+γ3)/2, respectively.

As the vehicle acceleration is continued with an increase in the output speed ωo with the vehicle speed, the following relationship is satisfied:

$$\omega i/\gamma 1 < \omega o,$$

$$\omega i/\gamma 2 = \omega o,$$

$$\omega i/\gamma 3 > \omega o$$

Thus, the second clutch C2 is brought to its fully engaged state, and a period D following the above-indicated period C begins, as indicated in FIG. 4. During this period D, the output torque $T_{out}$ of the output shaft 30 and the overall equivalent gear ratio γt of the transmission 10 are held constant. Thus, the transmission 10 is shifted from a first-speed gear position to a second-speed gear position.

In the second-speed gear position with the second clutch C2 placed in the fully engaged state, the power tends to be transmitted from the output shaft 30 to the input shaft 20 through the second gear train 26, 36. However, the second one-way clutch OWC2 connected in series with the second clutch C2 is released and slips, so that the power is transmitted from the input shaft 20 to the output shaft 30 through the still slipping third clutch C3. In this condition, namely, during a period E indicated in FIG. 4, the relationship between the rotating speeds of the input and output shafts 20, 30 satisfies the following inequalities:

$$\omega i/\gamma 1 < \omega o,$$

$$\omega i/\gamma 2 < \omega o,$$

$$\omega i/\gamma 3 > \omega o$$

During the period E, the output torque $T_{out}$ of the output shaft 30 and the overall equivalent gear ratio γt of the transmission 10 are equal to $T_{in} \cdot \gamma 3$ and γ3, respectively.

As the vehicle is further accelerated and the speed ωo of the output shaft 30 is increased with the vehicle speed, the following relationship is satisfied:

$$\omega i/\gamma 1 < \omega o,$$

$$\omega i/\gamma 2 < \omega o,$$

$$\omega i/\gamma 3 = \omega o$$

Thus, the third clutch C3 is brought to its fully engaged state, and a period F begins, as indicated in FIG. 4. During this period F, the output torque $T_{out}$ of the output shaft 30 and the overall equivalent gear ratio γt of the transmission 10 are held constant. Thus, the transmission 10 is shifted from the second-speed gear position to a third-speed position.

In the present vehicle transmission system described above, the electronic control device 98 activates the clutch control valve 96 upon starting of the vehicle, so that the first, second and third friction clutches C1, C2 and C3 are simultaneously placed in the slipping or partially engaged states during the initial period A, to transmit the power from the input shaft 20 to the output shaft 30 through the first, second and third gear trains in series connection with the respective clutches C1, C2, C3. As the output speed ωo of the output shaft 30 is increased relative to the input speed ωi of the input shaft 20 with an increase in the vehicle speed, the first one-way clutch OWC1 in series connection with the first gear train first begins to slip, and then the second one-way clutch OWC2 begins to slip, whereby the overall equivalent gear ratio γt of the transmission 10 is lowered in steps. Thus, the transmission 10 is smoothly shifted up as the vehicle speed is raised. The electronic control device 98 and the clutch control valve 96 constitute shift control means for controlling a shifting operation of the transmission 10.

Thus, the present vehicle transmission system does not require an expensive controller for selectively engaging one of the three friction clutches C1–C3 on the basis of the currently detected load of the engine 12 and vehicle speed. Instead, the electronic control device 98 simply activates the clutch control valve 96 for initial simultaneous partial or slipping engagement of the three clutches C1–C3, which results in stepping change of the equivalent gear ratio γr of the transmission 10 as the vehicle speed is raised. Therefore, the arrangement of the electronic control device 98 can be made simple and inexpensive. Further, the transmission 10 of the present transmission system has the first, second and third gear trains which are disposed in parallel with each other between the input and output shafts 20, 30, for parallel transmission of power through these three gear trains. Accordingly, the load acting on the transmission 10 is distributed to the three gear trains, whereby the required torque capacities of the gear trains and the torque capacities of the clutches C1–C3 and one-way clutches OWC1, OWC2 in series connection with the gear trains can be reduced as compared with those of the known transmission. Consequently, the size and weight of the transmission 10 can be accordingly reduced. For instance, the torque capacities of the first gear train 24, 34, first friction clutch C1 and first one-way clutch OWC1 can be reduced to one third of the input torque $T_{in}$, while those of the second gear train 26, 36, second friction clutch C2 and second one-way clutch OWC2 can be made to one half of the input torque $T_{in}$.

As explained above, the friction clutches C1, C2, C3 used in the transmission 10 are hydraulically operated and controlled by the common clutch pressure Pcl which is generated by the single clutch control valve 96 under the control of the electronic control device 98. In other words, the present transmission system does not require independent control valves for controlling the respective friction clutches C1–C3, and the hydraulic circuit can be accordingly simplified.

In the present embodiment, the three friction clutches C1, C2, C3 (52, 54, 58, 62, 64, 68, 72, 74, 78) provided on the output shaft 30 are operated by a single hydraulic clutch actuator consisting of the clutch piston 84, pusher spring 86, oil passages 88 and oil chamber 90. That is, the clutches C1–C3 are operated by the single hydraulic clutch actuator provided on the output shaft 30. Accordingly, a mechanism including the clutches C1–C3 and the clutch actuator 84, 86, 88, 90 and the control arrangement 96, 98 for the clutch actuator can be advantageously simplified.

In the transmission 10 according to the present embodiment, the fourth, fifth and sixth gears 34, 36, 38 of the three gear trains are provided on the output shaft 30 such that the gears 34, 36, 38 are axially movable on the output shaft 30, while the friction members 52, 54, 62, 64, 72, 74 of the clutches C1–C3 are incorporated in the gears 34, 36, 38 such that the friction members 52, 54 are operated directly by the clutch piston 84 while the friction members 62, 64, 72, 74 are operated by the clutch piston 84 via the gears 34, 36, 38. This arrangement permits considerable reduction in the number of the required components and the axial dimension of the transmission 10.

The first gear train 24, 34 functions to establish the first-speed position of the transmission 10. The first friction clutch C1 in series connection with this first gear train 24, 34 is partially engaged upon starting and initial acceleration of the vehicle. Since the power is transmitted from the input shaft 20 to the output shaft 30 through the first gear train 24, 34 and partially engaged first clutch C1 upon starting of the vehicle, a relatively large vehicle drive torque is applied to the drive wheels. This advantage is compatible with the load distribution to the three gear trains and the corresponding friction clutches C1, C2, C3 described above.

Another advantage of the present transmission system lies in that although the input shaft 20 is directly coupled with the engine 12 without a torque converter interposed therebetween, the vehicle drive torque can be smoothly increased by simultaneous slipping engagement of the three friction clutches C1–C3 with the clutch pressure Pcl slowly raised by the clutch control valve 96 under the control of the electronic control device 98 as indicated in FIG. 5.

In the illustrated embodiment, the clutches C1–C3 are simultaneously partially engaged by the biasing force of the pusher spring 86, while the pressure in the oil chamber 90 is held at the atmospheric level during running of the vehicle. Namely, the clutch pressure Pcl is applied to the oil chamber 90 only when the friction clutches C1–C3 are fully released. According to this arrangement, it is not required that the line pressure from the pressure regulator 94 be kept applied to the clutch control valve 96. That is, it is not necessary to keep operating the oil pump 92, whereby the power consumption by the oil pump 92 is minimized.

Referring to FIGS. 6–9, there will be described other embodiments of the present invention. The same reference signs as used in the first embodiment of FIGS. 1–5 will be used to identify the corresponding elements, which will not be described in the interest of simplification.

Figure 6:
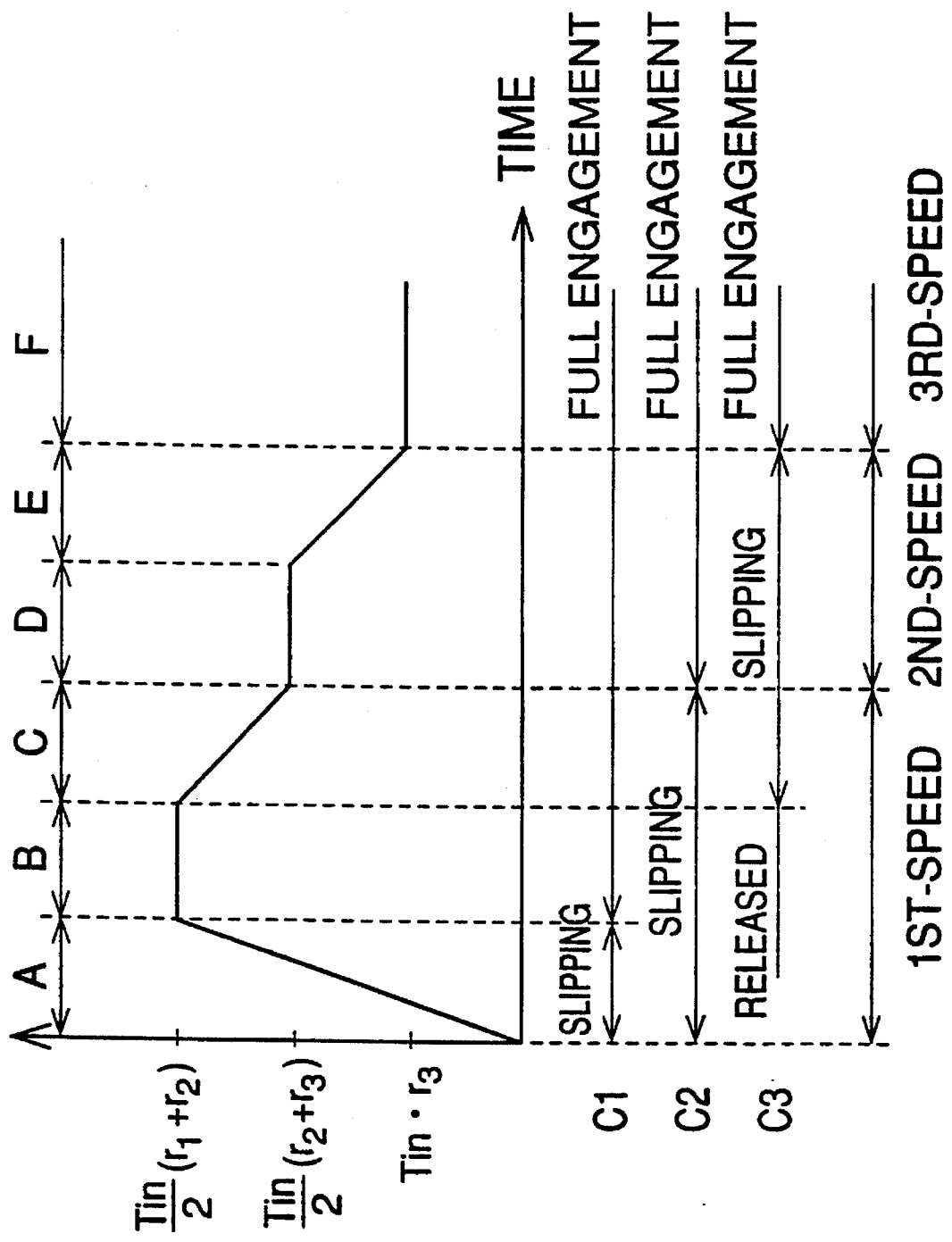
FIG. 6 is a time chart corresponding to that of FIG. 4, showing another embodiment of this invention.

The graph of FIG. 6 indicates a change in the output torque $T_{out}$ in the transmission system according to the second embodiment wherein the first and second friction clutches C1, C2 are operated by the hydraulic clutch actuator including the clutch piston 84, while the third friction clutch C3 is operated independently of the first and second clutches C1, C2, by another hydraulic actuator (not shown), both actuators being controlled by the control of the electronic control device 98.

In the present second embodiment, the clutch pressure Pcl within the oil chamber 90 is slowly lowered down to the atmospheric pressure through the clutch control valve 96, as indicated in FIG. 5, upon starting of the vehicle, as in the first embodiment. As a result, the first and second friction clutches C1, C2 are slowly and simultaneously placed in the slipping or partially engaged states, so that the torque $T_{in}$ of the input shaft 20 (output torque $T_E$ of the engine 12) is transmitted to the output shaft 30 through the first and second clutches C1, C2, whereby the output torque $T_{out}$ is increased from zero as indicated at "period A" in the graph of FIG. 6.

During the period A in which the first and second clutches C1, C2 are both partially engaged, the following inequalities and equation are satisfied with respect to the rotating speeds of the input and output shafts 20, 30, output torque $T_{out}$ and overall equivalent gear ratio $\gamma t$ of the transmission 10:

$\omega i/\gamma 1 > \omega o$, $\omega i/\gamma 2 > \omega o$, $T_{out} = T_{in}(\gamma 1 + \gamma 2)$, $\gamma t = T_{out}/T_{in}$, $\gamma t = (\gamma 1 + \gamma 2 + \gamma 3)/2$ As the vehicle is continuously accelerated, the rotating speed $\omega o$ of the output shaft 30 is increased with the vehicle speed, and the rotating speeds $\omega i$ and $\omega o$ of the input and output shafts 20, 30 change so as to satisfy the following equation and inequality:

$\omega i/\gamma 1 = \omega o$, $\omega i/\gamma 2 > \omega o$,

When the above equation and inequality are satisfied, the first clutch C1 is brought to the fully engaged state, and the period B following the above-indicated period A begins, as indicated in FIG. 6. During this period B, the output torque $T_{out}$ of the output shaft 30 and the overall equivalent gear ratio $\gamma t$ of the transmission 10 are held constant. At the end of the period B which is prior to the moment at which the second clutch C2 is brought to its fully engaged state, the third clutch C3 is placed to its slipping or partially engaged state. That is, the period C begins. The moment at which the partial engagement of the third clutch C3 is started, namely, the beginning of the period C is determined by the electronic control device 98, on the basis of the currently detected speed of the engine 12 and vehicle speed, and according to a predetermined relationship between the engine and vehicle speeds. This relationship is stored in a memory of the control device 98. The second clutch C2 is brought to the fully engaged state at the end of the period C, and the transmission 10 is thus shifted up from the first-speed position to the second-speed position.

During the period D following the period C, the overall equivalent gear ration $\gamma t$ of the transmission 10 is held constant at $(\gamma 2 + \gamma 3)/2$ while the output torque $T_{out}$ is held constant at $T_{in}(\gamma 2 + \gamma 3)/2$. The third clutch C3 is brought to the fully engaged state at the end of the following period E, and the transmission 10 is shifted up to the third-speed position at the beginning of the following period F. During the period F, the overall equivalent gear ratio γt is held constant at γ3 while the output torque $T_{out}$ is held constant at $T_{in} \cdot γ3$.

The present second embodiment provides the same advantages as the first embodiment. Further, the second embodiment is adapted such that the slipping or partial engagement of the third clutch C3 is started at the beginning of the period C, so that the output torque $T_{out}$ during the period B is equal to $T_{in}(γ2+γ3)/2$, which is larger than the corresponding output torque $T_{out}=T_{in}(q1+q2+q3)/3$ in the first embodiment. This permits increased acceleration of the vehicle upon starting. The electronic control device 98 first controls the clutch control valve 96 to start simultaneous slipping or partial engagement of the first and second clutches C1, C2, and then controls another clutch control valve to start slipping engagement of the third clutch C3 before the second clutch C2 is brought to its fully engaged state. Therefore, upon starting of the vehicle, the power is transmitted fro the input shaft 20 to the output shaft 30 through the first and second gear trains whose gear ratios are higher than that of the third gear train, whereby the drive torque upon starting of the vehicle is increased. Thus, the present embodiment also assures a sufficiently large drive torque upon starting of the vehicle, and distribution of the load of the transmission 10 to the three gear trains and friction clutches after the third clutch C2 is partially engaged. Further, the third clutch C3 has a relatively high degree of durability since it is held released for an initial period, which ends after the first clutch C1 is fully engaged and before the second clutch C2 is fully engaged.

Figure 7:
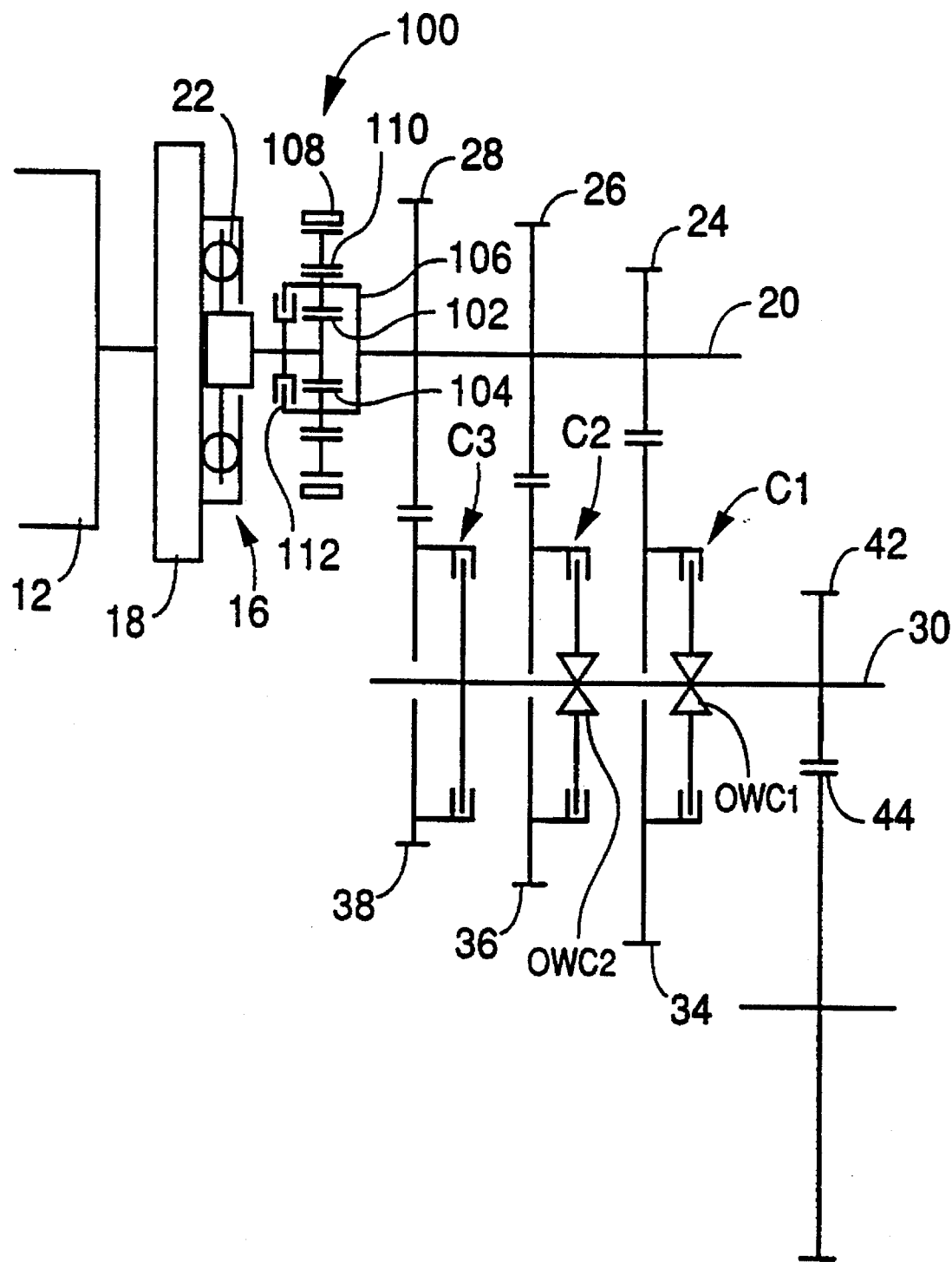
FIG. 7 is a schematic view corresponding to that of FIG. 1, illustrating an arrangement of a transmission according to a further embodiment of the invention.

A third embodiment of this invention is illustrated in FIG. 7, in which an auxiliary transmission 100 is interposed between the damper 16 of the flywheel 18 and the input shaft 20 of the transmission 10. The auxiliary transmission 100 includes: a sun gear 102 connected to the damper 16; planetary gears 104 meshing with the sun gear 102; a carrier 106 which rotatably carries the planetary gears 104 and which is connected to the input shaft 20; a ring gear 110 which meshes with the planetary gears 104 and which is fixed to a stationary member (not shown) by operation of a band brake 108; and a clutch 112 operable to connect the sun gear 102 and the carrier 106. The auxiliary transmission 100 has a gear ratio of "1" when the clutch 112 is in the engaged state, and a gear ratio γs when the band brake 108 is engaged. Thus, the auxiliary transmission 100 has two forward drive positions.

In the vehicle transmission system according to the present third embodiment, the auxiliary transmission 100 is interposed between the engine 12 and the input shaft 20 of the transmission 10, and is connected in series with the transmission 10, so that the transmission system provides a total of six forward drive positions having respective different speed ratios: $γs(γ1+γ2+γ3)/3$; $γs(γ2+γ3)/2$; $γs \cdot γ3$; $(γ1+γ2+γ3)/3$; $(γ2+γ3)/2$; and $γ3$. These forward drive positions are selectively established, with the 10 control device 98 suitably controlling the clutch control valve 96 and suitable actuators for the clutch 112 and band brake 108. However, the transmission system may be adapted to use some of these six forward drive positions.

Figure 8:
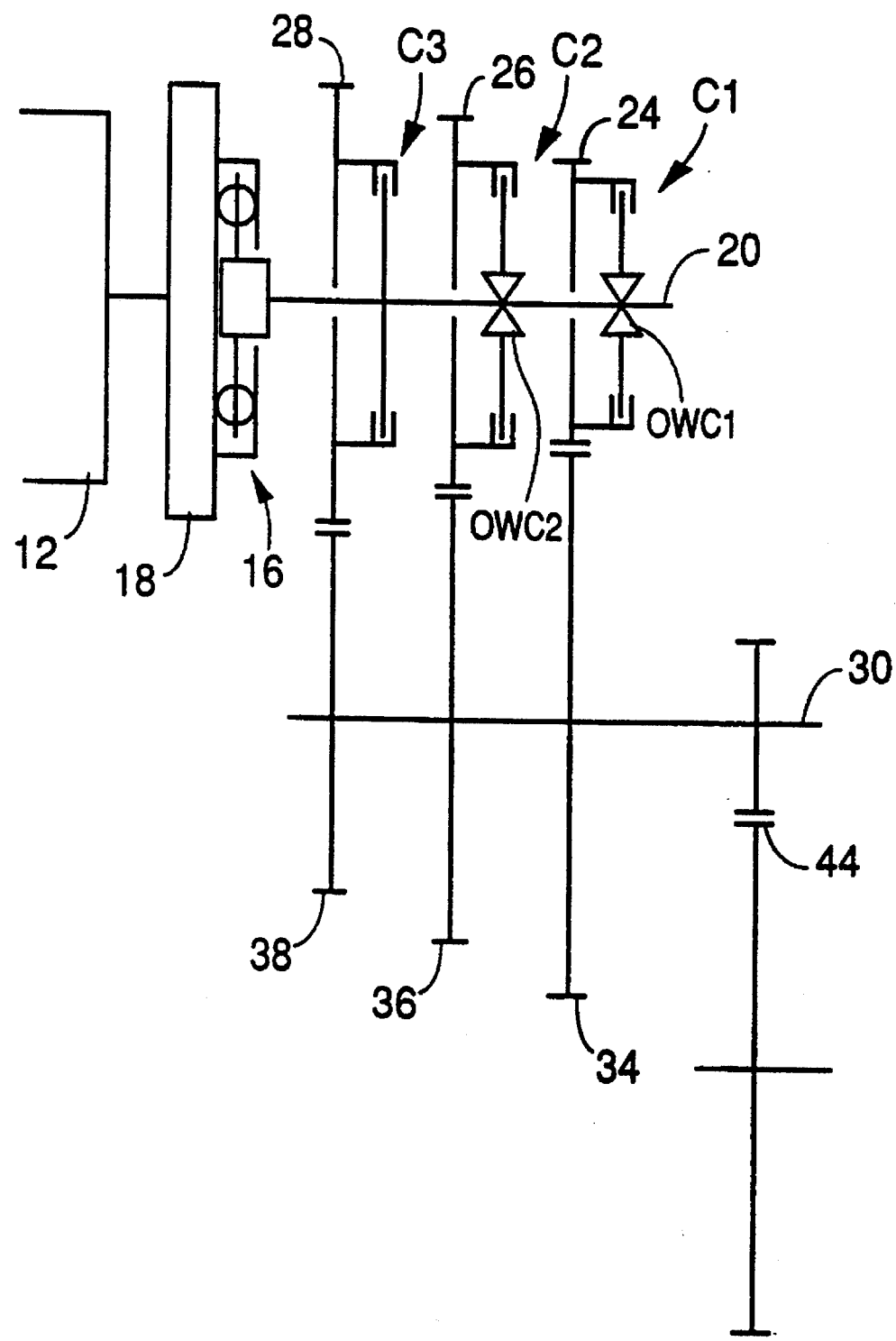
FIG. 8 is a schematic view illustrating an arrangement of a transmission according to a still further embodiment of the invention.
Figure 9:
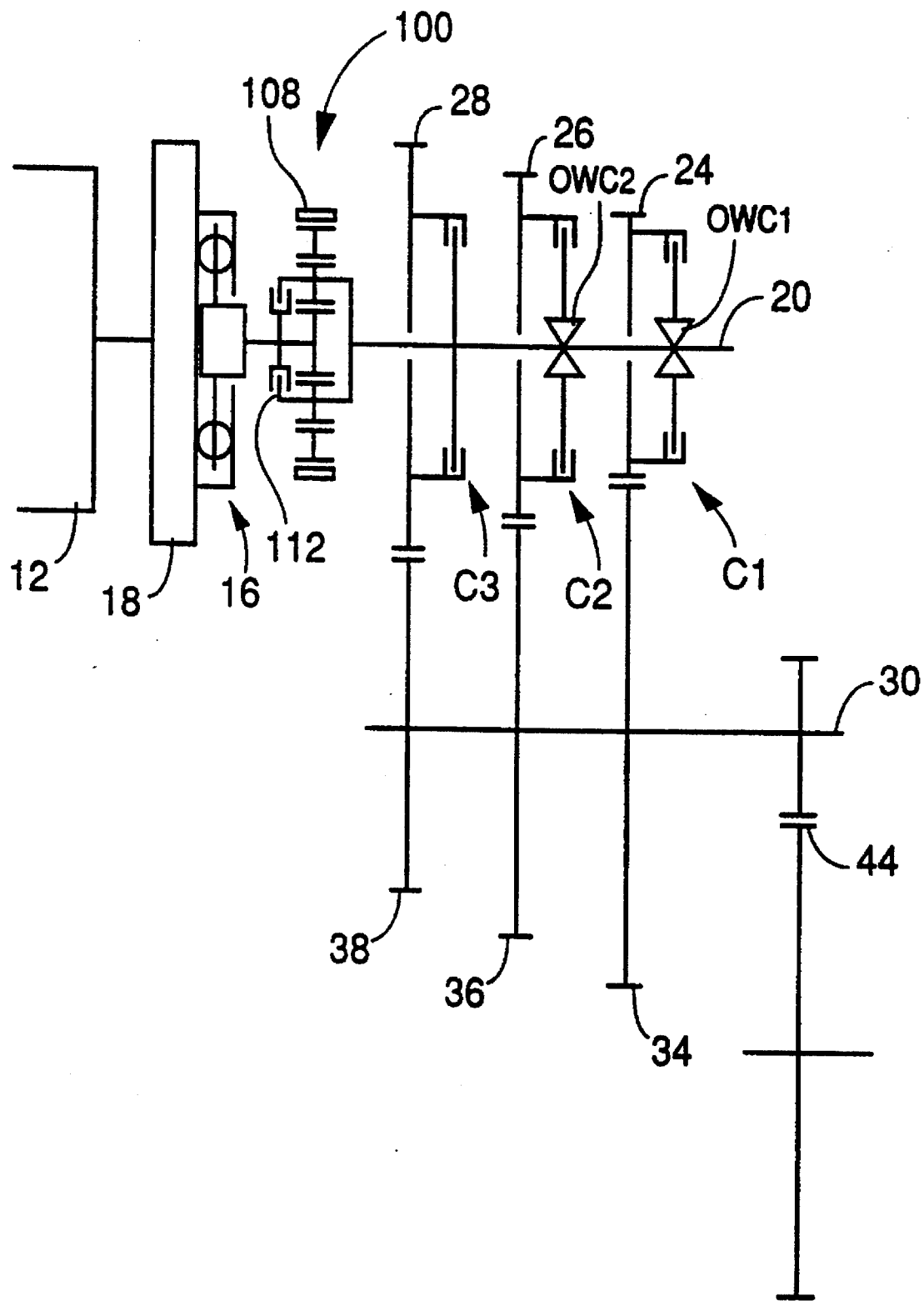
FIG. 9 is a schematic view illustrating an arrangement of a transmission according to a yet further embodiment of the invention.

FIGS. 8 and 9 show fourth and fifth embodiments of the invention, respectively, wherein the friction clutches C1, C2, C3, one-way clutches OWC1, OWC2 and the hydraulic clutch actuator for the clutches C1–C3 are provided on the input shaft 20. In the fifth embodiment of FIG. 9, the auxiliary transmission 100 as described above with respect to the third embodiment is disposed between the damper 16 and the input shaft 20. These fourth and fifth embodiments provide the same advantages as described above with respect to the first and third embodiments of FIGS. 1 and 7. Further, since the input shaft 20 on which the clutches C1, C2, C3, OWC1, OWC2 are provided has a higher rotating speed than the output shaft 30, the required torque capacities of these clutches can be made smaller, whereby the size and cost of the clutches can be reduced.

While the present invention has been described in its presently preferred embodiments by reference to the accompanying drawings, it is to be understood that the present invention may be embodied otherwise.

In the illustrated embodiments, the force of the clutch piston 84 acting on the clutches C1–C3 which is held constant when the clutch pressure Pcl is at the atmospheric level as indicated in FIG. 5 is determined by the biasing force of the pusher spring 86. The clutch piston force may be determined on the basis of a difference between the biasing force of the pusher spring 86 and a thrust force of the clutch piston 84 when the clutch pressure Pcl is lowered to a predetermined level above the atmospheric pressure. In this modified arrangement, the constant force of the clutch piston 84 acting on the clutches C1–C3 may be changed depending upon the operating amount of an accelerator pedal of the vehicle. In other words, the amount of torque transmitted to the output shaft 30 through the partially engaged clutches C1–C3 can be changed depending upon the load currently acting on the engine 12.

Although the illustrated embodiments are adapted to increase the clutch operating force of the clutch piston 84 with a decrease in the clutch pressure Pcl, the clutch operating force may be increased as the clutch pressure Pcl is increased.

While the clutch operating force of the clutch piston 84 is increased as indicated in the graph of FIG. 5, the clutch operating force may be increased to a level which varies with a difference between an actually detected speed $N_E$ of the engine 12 and a preset idling speed $N_{IDL}$ of the engine 12.

In the illustrated vehicle transmission systems, the power is transmitted from the output shaft 30 to the drive wheels via the final gear 44. However, the final gear 44 may be eliminated, In the illustrated embodiments, the clutch pressure Pcl to be applied to the oil chamber 90 to release the clutches C1–C3 is generated by the oil pump 92. However, a suitable master cylinder may be used to generate the clutch pressure Pcl. In this case, the master cylinder may be operated by a clutch pedal usually provided on a motor vehicle equipped with a manual transmission.

While the presently preferred embodiments and possible modifications thereof have been described above for illustrative purpose only, it is to be understood that various other changes, modifications and improvements may be made in the invention, without departing from the spirit and scope of the invention defined in the following claims.

What is claimed is:

1. A transmission system of a motor vehicle having a transmission including an input shaft which receives power from a power source, an output shaft and a plurality of gear trains which have respective different gear ratios and which are disposed so as to connect said input and output shafts for transmitting the power from said input shaft to said output shaft, said transmission system comprising:

said plurality of gear trains including a first gear train, a second gear train and a third gear train whose gear ratios decrease in the order of description, a plurality of frictional coupling devices including a first, a second and a third frictional coupling device which are disposed in series connection with said first, second and third gear trains, respectively;

a first and a second one-way clutch which are disposed in series connection with corresponding at least one of said first and second gear trains, said first and second one-way clutches being engaged to transmit the power from said input shaft to said output shaft, and released to inhibit the power from being transmitted from said output shaft to said input shaft; and shift control means, operable during a forward running of said motor vehicle, for controlling said plurality of frictional coupling devices for simultaneous slipping engagement of said first, second and third frictional coupling devices such that all of said first, second and third frictional coupling devices are simultaneously placed in partially engaged states thereof for an initial period of time upon starting of said motor vehicle, for simultaneous transmission of the power from said input shaft to said output shaft through said first, second and third gear trains.

2. A transmission system according to claim 1, further comprising a hydraulically operated actuator for operating said plurality of frictional coupling devices with a hydraulic pressure, and wherein said shift control means comprises means for controlling application of said hydraulic pressure to said actuator for controlling the engagement of said frictional coupling devices.

3. A transmission system according to claim 2, wherein each of said plurality of frictional coupling devices comprises a plurality of friction members which are disposed in series with a corresponding one of said plurality of gear trains for connecting said corresponding one gear train to said input and output shafts, and wherein said hydraulically operated actuator comprises a common clutch piston provided on one of said input and output shafts such that said common clutch piston is movable in an axial direction of said input and output shafts, between a first position in which said corresponding one gear train is connected to said input and output shafts through said friction members, and a second position in which said corresponding one gear train is disconnected from said input and output shafts by said friction members.

4. A transmission system according to claim 3, wherein each of said plurality of gear trains includes an axially movable gear provided on said one of said input and output shafts such said axially movable gear is axially movable in said axial direction, said plurality of friction members of said each frictional coupling device being disposed within said axially movable gear, said common clutch piston directly pushing said plurality of friction members of one of said plurality of frictional coupling devices against each other when said common clutch piston is moved from said second position to said first position, and pushing said plurality of friction members of each of the rest of said plurality of frictional coupling devices via said axially movable gears of said plurality of gear trains when said common clutch piston is moved from said second position to said first position.

5. A transmission system according to claim 1, wherein the gear ratios of said first, second and third gear trains correspond to a first-speed, a second-speed and a third-speed gear position of said transmission, respectively, said first-speed gear position having a largest speed reduction ratio, and wherein said shift control means places said first frictional coupling device in said partially engaged state thereof upon starting of said motor vehicle, and in a fully engaged state before full engagement of said second and third frictional coupling devices.

6. A transmission system according to claim 1, wherein said input shaft is connected to said power source, without a difference between an operating speed of said power source and a rotating speed of said input shaft.

7. A transmission system according to claim 1, further comprising an auxiliary transmission interposed between said power source and said input shaft, said auxiliary transmission having a plurality of gear positions for forward driving of said motor vehicle.

8. A transmission system according to claim 5, wherein said shift control means simultaneously places said first, second and third frictional coupling devices in said partially engaged states for simultaneous transmission of the power from the input shaft to the output shaft through said first, second and third gear trains so that said first-speed, second-speed and third-speed gear positions of said transmission are established in the order of description as a running speed of the vehicle is raised.

9. A transmission system of a motor vehicle having a transmission including an input shaft which receives power from a power source, an output shaft and a plurality of gear trains which have respective different gear ratios and which are disposed so as to connect said input and output shafts for transmitting the power from said input shaft to said output shaft, said transmission system comprising:

said plurality of gear trains including a first gear train, a second gear train and a third gear train whose gear ratios decrease in the order of description, a first, a second and a third frictional coupling device which are disposed in series connection with said first, second and third gear trains, respectively;

a first and a second one-way clutch which are disposed in series connection with said first and second gear trains, said first and second one-way clutches being engaged to transmit the power from said input shaft to said output shaft, and released to inhibit the power from being transmitted from said output shaft to said input shaft; and shift control means, operable during a forward running of said motor vehicle, for simultaneously placing said first and second frictional coupling devices in partially engaged states thereof while holding said third frictional coupling device in a fully released state in an initial period of time upon starting of said motor vehicle, said shift control means placing said third frictional coupling device in a partially engaged state before said second frictional coupling device is brought to a fully engaged state thereof.

10. A transmission system according to claim 9, wherein said shift control means places said third frictional coupling device in said partially engaged state after said first frictional coupling device is brought to a fully engaged state thereof.

11. A transmission system according to claim 9, wherein the gear ratios of said first, second and third gear trains correspond to a first-speed, a second-speed and a third-speed gear position of said transmission, respectively, said first-speed gear position having a largest speed reduction ratio, and wherein said shift control means places said first frictional coupling device in said partially engaged state thereof upon starting of said motor vehicle, and in a fully engaged state before full engagement of said second frictional coupling device.

12. A transmission system according to claim 11, wherein said shift control means simultaneously places said first, second and third frictional coupling devices in said partially engaged states for simultaneous transmission of the power from the input shaft to the output shaft through said first, second and third gear trains so that said first-speed, second-speed and third-speed gear positions of said transmission are established in the order of description as a running speed of the vehicle is raised.

* * * * *